June 23, 1953    H. H. MONTAGUE    2,642,643
METHOD AND MEANS FOR PREPARING CERAMIC CLAYS
Filed Sept. 29, 1950    2 Sheets-Sheet 1
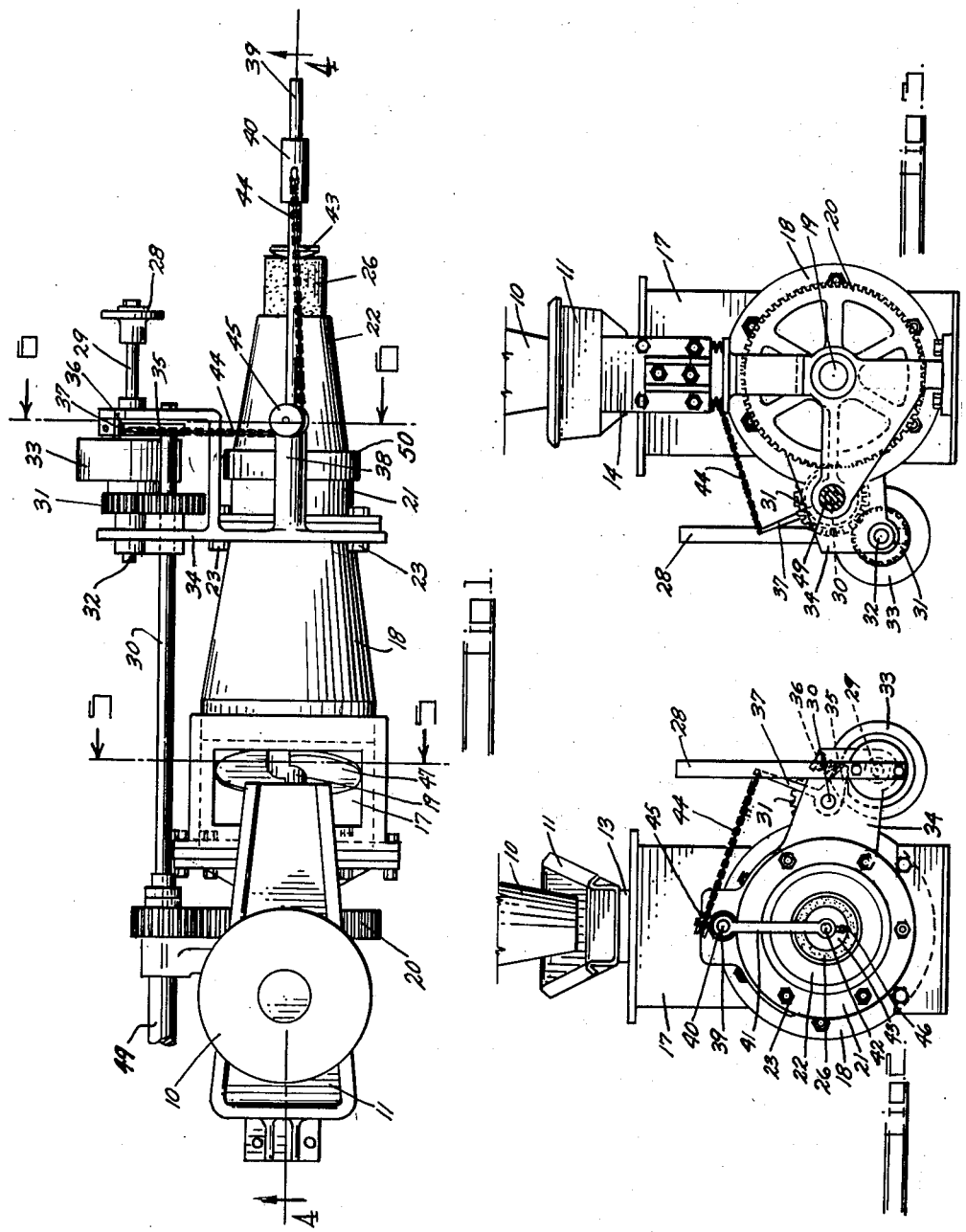
INVENTOR.
HARLEY H. MONTAGUE
BY
ATTORNEY

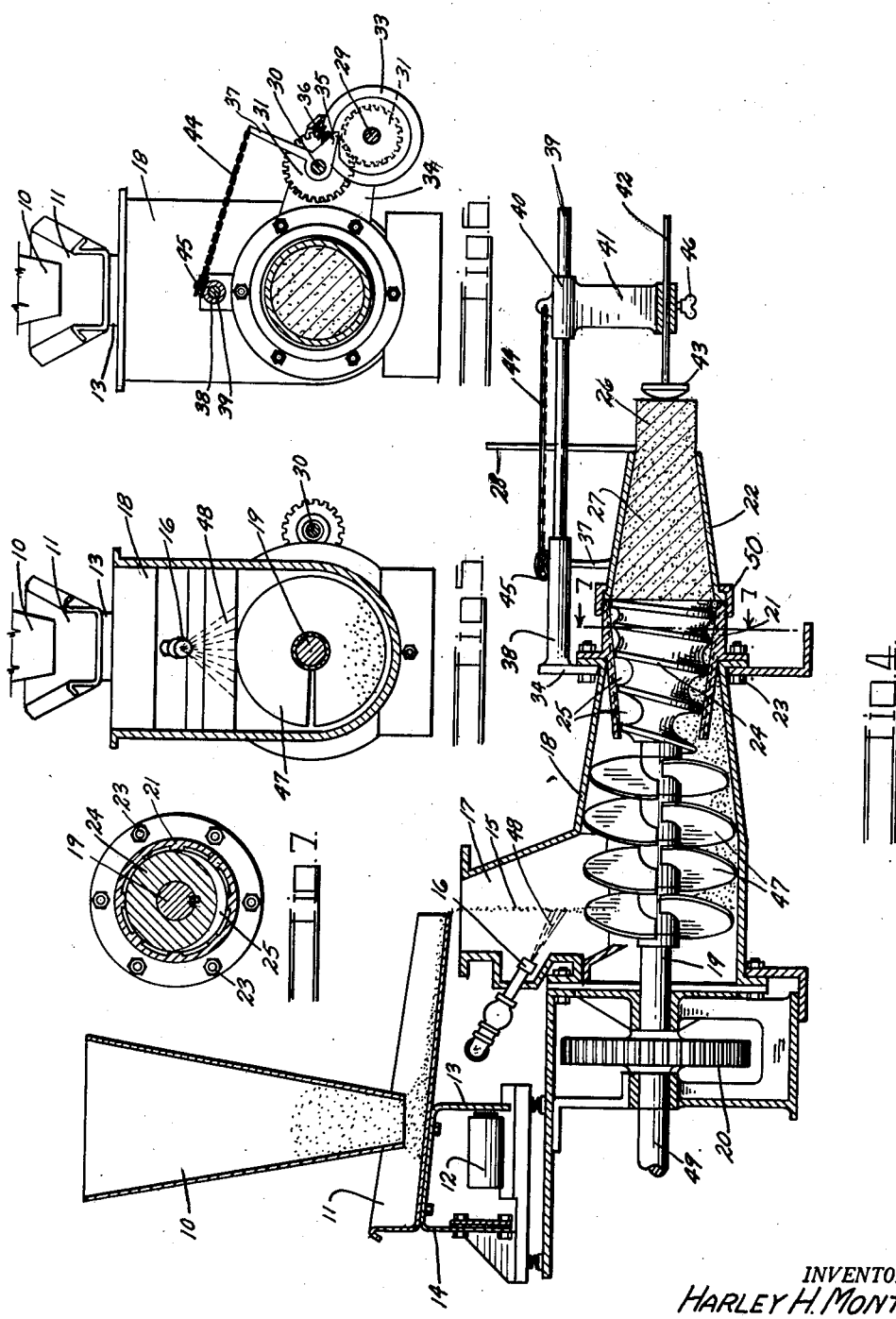

Patented June 23, 1953

2,642,643

UNITED STATES PATENT OFFICE 2,642,643

METHOD AND MEANS FOR PREPARING CERAMIC CLAYS

Harley H. Montague, Denver, Colo., assignor to American Clay Works & Supply Co., Denver, Colo., a corporation of Colorado Application September 29, 1950, Serial No. 187,585

6 Claims. (Cl. 25—14)

This invention relates to a method and means for preparing pottery clay for ceramic uses, and has for its principal object the provision of a simple and highly efficient method and means for preparing moistened plastic clay directly from dry clay without the usual expensive and time consuming pugging operation.

Another object of the invention is to provide means for continuously ejecting a plastic bar of moist clay and automatically cutting the moving clay bar at any preset interval to form moist briquettes or gobs of clay of uniform weight for feeding to ceramic presses or other uses.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

In the drawing:

Fig. 1 is a top plan view of the improved clay mixing and briquetting machine;

Fig. 2 is a front end view thereof;

Fig. 3 is a rear end view thereof;

Fig. 4 is a longitudinal section through the improved clay machine, taken on the line 4—4, Fig. 1;

Figs. 5 and 6 are cross-sections, taken on the lines 5—5 and 6—6, respectively, Fig. 1; and Fig. 7 is a detail cross-section, taken on the line 7—7, Fig. 4.

The improved method comprises causing a relatively thin, wide uniform curtain of finely ground clay to fall continuously in front of a flat, fan-shaped, atomizing, water spray so that the atomized drops of water will be caused to strike, soften, and be absorbed by the falling grains of the clay so as to obtain an efficient admixture of the clay and water without mechanical mixing.

Clay is usually moistened and run through a pugging mill, where constant mixing and agitation of the clay in the water will eventually cause the water to be absorbed in the grains of clay. Such a method consumes power and time to obtain a perfect intimate intermixture between the water drops and the clay grains.

In this improved process the pugging step is entirely avoided, since the water is formed in fractional or atomized drops, and these drops are forced into a thin curtain of powdered clay grains so that each fractional grain of clay will be properly wetted immediately and instantly, without mechanical mixing.

One means of carrying out the improved method is illustrated in the accompanying drawing, in which finely powdered clay is fed into a feed hopper 10 which terminates just above the bottom of an inclined vibrating pan 11. The pan is vibrated longitudinally and vertically from an electric solenoid 12 acting against an armature 13 secured to the bottom of the pan. The pan 11 is resiliently mounted on a flexible supporting arm 14 so that it is free to be vibrated by the armature 13 under the influence of a rapidly alternating or vibrating electric current fed to the solenoid 12 from any suitable source.

The vibration causes the powdered clay to slowly feed from the hopper 10 and separates the grains of powdered clay into a loosely compacted aerated layer of uniform thickness over the entire pan 11. This vibrating, fluid-like sheet constantly moves forwardly and continuously falls over the front lip of the pan 11 in a thin, uniform curtain 15 of powdered clay. The thickness of the curtain, that is, the amount of clay discharging from the pan, can be minutely and accurately adjusted by varying the amount and/or vibration cycle of the current supplied to the solenoid 12.

This thin, solid and continuous curtain of powdered clay falls in front of an atomizing spray nozzle 16 of a type to spray a thin, fan-shaped mist of water vapor substantially horizontally across the entire width of the clay curtain as indicated at 48. From the horizontal line of contact with the water, the clay falls in a perfectly moistened, workable condition, ready to be fed to any of the usual clay molding or spinning machines.

In the improved machine, the clay curtain, indicated at 15, falls into a receiving hopper 17. The spray nozzle 16 extends through the rear wall of the hopper 17 at a downwardly inclined angle. The hopper 17 feeds into a conical clay press 18. An auger shaft 19 extends throughout the length of the clay press 18 from a driven gear 20 or other suitable driving element. The walls of the clay press 18 conically converge to join a conical auger shell 21, from whence a conical bar-forming spout 22 projects. The auger shell 21 is secured to a flanged extremity on the press by means of clamp bolts 23 and the spout is clamped onto the extremity of the shell 21 by means of a threaded flanged ring 50. The auger shell 21 extends into the extremity of the clay press and is provided with a hollow conical interior which increases in diameter as the spout 22 is approached.

Screw conveyor blades 47 are mounted on the shaft 19 within the clay press immediately below the hopper 17 to convey the clay forwardly to a rotating, grooved, conical auger member 24 which is mounted on the shaft 19 within the increasing cone of the shell 21. The auger member 24 increases in diameter as the discharge extremity of the clay press is approached and is provided with a spiral groove 25 extending its entire length. The groove 25 has a semi-circular cross-section which decreases in radius and pitch as the discharge extremity is approached. The combination of the decreasing cone of the clay press and the increasing cone of the auger member 24 with the decreasing groove 25 results in a continuous spiral stream of highly compressed clay being forced into the forming spout 22. The decreasing conical shape of the latter still further increases the pressure in the clay, indicated at 27, to form a uniform, homogeneous mixture of uniform moisture content which discharges from the spout as a smooth, compact, continuous clay bar, as indicated at 26.

The bar 26 of clay is cut off at any desired uniform interval to form clay gobs of any desired weight, by means of an intermittently rotated, pivoted knife blade 28 mounted on a knife shaft 29 alongside the forming spout 22 so as to swing across the discharge of the latter in close proximity thereto.

The knife shaft 29 is rotated from a countershaft 30 through the medium of reversing gears 31 and a drive shaft 32. The drive shaft 32 terminates in a single-revolution clutch 33 through which rotative effort is transmitted to the knife shaft 29. The counter-shaft 30, the knife shaft 29, the gears 31, and the drive shaft 32, are all supported in a bearing frame 34 which is secured to one side of the press by means of the clamp bolts 23. Clutches of the single-revolution type are available on the open market and are so arranged that when a dog is released from a retaining notch in the clutch, the latter will engage to rotate a driven shaft one revolution, where it is stopped by the restraining dog again entering its locking notch to release the clutch.

In this invention, the clutch 33 is restrained by means of a hinged restraining dog 35 which is constantly urged into engagement with a ratchet notch in the clutch 33 by means of a spring 34. The restraining dog 35 is provided with an actuating lever 37 by means of which it is lifted out of engagement with the clutch 33. A rigid supporting arm 38 extends forwardly from the bearing frame 34 above the forming spout 22 to support a slide rod 39 parallel to the axis of the press. A sleeve 40 is slidably mounted on the rod 39 from which an arm 41 depends to support a disc rod 42 which carries a contact disc 43 directly in the path of the discharging clay 26. A flexible member 44, such as a chain or cord, connects the sliding sleeve 40 with the actuating lever 37. The flexible member 44 is trained around a guide pulley on the supporting arm 38.

Thus, the discharging clay engages the contact disc 43 and pushes the latter and the sleeve 40 outwardly to tighten the flexible member 44 and cause it to disengage the clutch dog 35. This releases the clutch 33 to cause the knife blade 28 to swing one complete revolution so as to sever the clay bar 26. The downward movement of the knife blade causes the severed clay gob to tilt from the disc 43 and fall from the press to any desired clay-forming device. This releases the flexible medium 44 and allows the clutch dog 35 to again engage and release the clutch 33 to stop the knife blade at its "at rest" position until the clay bar again reaches the cut-off position. The length of the final clay plug or gob can be adjusted in advance by varying the position of the disc rod 42 in the arm 41. The rod may be set in any desired position by means of a set screw 46.

While a specific form of the improvement has been described and illustrated herein, it is to be understood that the same may be varied, within the scope of the appended claims, without departing from the spirit of the invention.

Having thus described the invention, what is claimed and desired secured by Letters Patent is:

1. A method of mixing clay with water comprising: grinding the clay to a relatively fine mesh; causing the ground clay to fall in a continuous relatively thin, flat, curtain-like stream or sheet lying in a flat vertical plane; forming a flat thin solid jet of water; and spraying the solid flat fan-shaped spray of water at an angle to the plane of the descending flat sheet of ground clay so as to intersect the vertical flat clay sheet on a substantially horizontal line to obtain an intimate mixture of clay and water during the final descent of said sheet.

2. A clay-moistening apparatus comprising: an open-ended, flat-bottomed vibrating pan; a feed hopper feeding dry, ground clay into said pan; means for imparting a rapid vibration to said pan to cause the clay to spread in a uniform, thin layer over the flat bottom of said pan, and to cause the thin, vibrating layer of clay to flow from the flat bottom at the open end of said pan in a thin, continuous, falling sheet; and a water nozzle positioned below said pan opposite one flat side of the sheet of falling clay, said nozzle acting to spray a fan-like, atomized sheet of water across the entire width of the path of the sheet of falling clay.

3. A clay-moistening apparatus comprising: a vibrating pan; a feed hopper feeding into said pan; means for imparting a rapid vibration of said pan to cause the clay to spread in a thin vibrating layer, said layer overflowing said pan at one edge thereof in a continuous sheet; a water nozzle positioned below said pan so as to be adjacent the sheet of falling clay, said nozzle being arranged to spray a fan-like sheet of water vapor below said edge and transversally across the path of the entire sheet of falling clay; a conical clay press; a hopper on said clay press positioned to receive the falling moistened clay; a shaft extending through said clay press; a conical discharge member on said clay press; and a spirally grooved auger member mounted on said shaft adjacent said discharge member and arranged to press and force the moistened clay into the conical discharge member.

4. A clay-moistening apparatus comprising: a vibrating pan; a feed hopper feeding into said pan; means for imparting a rapid vibration of said pan to cause the clay to spread in a thin vibrating layer, said layer overflowing said pan at one edge thereof in a continuous sheet; a water nozzle positioned below said pan so as to be adjacent the sheet of falling clay, said nozzle being arranged to spray a fan-like sheet of water vapor below said edge and transversally across the path of the entire sheet of falling clay; a conical clay press; a hopper on said clay press positioned to receive the falling moistened clay; a shaft extending through said clay press; a conical discharge member on said clay press; a spirally grooved auger member mounted on said shaft adjacent said discharge member and arranged to press and force the moistened clay into the conical discharge member; and means for conveying the clay from said hopper to said auger.

5. A clay-moistening apparatus comprising: a vibrating pan; a feed hopper feeding into said pan; means for imparting a rapid vibration of said pan to cause the clay to spread in a thin vibrating layer, said layer overflowing said pan at one edge thereof in a continuous sheet; a water nozzle positioned below said pan so as to be adjacent the sheet of falling clay, said nozzle being arranged to spray a fan-like sheet of water vapor below said edge and transversally across the path of the entire sheet of falling clay; a conical clay press; a hopper on said clay press positioned to receive the falling moistened clay; a shaft extending through said clay press; a conical discharge member on said clay press; and a spirally grooved auger member mounted on said shaft adjacent said discharge member and arranged to press and force the moistened clay into the conical discharge member, said auger increasing in diameter as the discharge is approached and being provided on its exterior with a continuous spiral groove, the cross-section and pitch of said groove decreasing as the discharge is approached.

6. A clay-moistened apparatus comprising: a vibrating pan; a feed hopper feeding into said pan; means for imparting a rapid vibration of said pan to cause the clay to spread in a thin vibrating layer, said layer overflowing said pan at one edge thereof in a continuous sheet; a water nozzle positioned below said pan so as to be adjacent the sheet of falling clay, said nozzle being arranged to spray a fan-like sheet of water vapor below said edge and transversally across the path of the entire sheet of falling clay; a conical clay press; a hopper on said clay press positioned to receive the falling moistened clay; a shaft extending through said clay press; a pressure cylinder concentrically mounted on the smaller diameter extremity of said clay press; a discharge cone concentrically mounted on said pressure cylinder; and a conical, spiral-grooved auger member mounted on said shaft and extending from said clay press through said pressure cylinder, the larger diameter extremity of said auger member being positioned adjacent said discharge cone for gradually increasing the pressure on said clay before discharging it into said cone.

HARLEY H. MONTAGUE.

References Cited in the file of this patent

UNITED STATES PATENTS

| Number | Name | Date |
|---|---|---|
| 397,770 | Young | Feb. 12, 1889 |
| 475,915 | Arnold | May 31, 1892 |
| 598,282 | Carmichael | Feb. 1, 1898 |
| 1,106,456 | Kelley | Aug. 11, 1914 |
| 1,367,513 | Mann | Feb. 1, 1921 |
| 1,727,580 | White | Sept. 10, 1929 |
| 1,885,774 | Showers | Nov. 1, 1932 |
| 1,964,266 | McElroy et al. | June 26, 1934 |